(12) United States Patent
Cho

(10) Patent No.: US 9,142,250 B2
(45) Date of Patent: Sep. 22, 2015

(54) SYSTEM AND METHOD FOR PREVENTING ILLEGAL COPY

(75) Inventor: Young Bin Cho, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 142 days.

(21) Appl. No.: 13/699,160

(22) PCT Filed: Dec. 3, 2010

(86) PCT No.: PCT/KR2010/008644
§ 371 (c)(1),
(2), (4) Date: Feb. 4, 2013

(87) PCT Pub. No.: WO2011/145793
PCT Pub. Date: Nov. 24, 2011

(65) Prior Publication Data
US 2013/0133077 A1 May 23, 2013

(30) Foreign Application Priority Data
May 20, 2010 (KR) .................. 10-2010-0047260

(51) Int. Cl.
*G06F 21/00* (2013.01)
*G11B 20/00* (2006.01)
*H04L 9/32* (2006.01)
(Continued)

(52) U.S. Cl.
CPC ........ *G11B 20/00855* (2013.01); *G11B 19/122* (2013.01); *G11B 20/00086* (2013.01); *G11B 20/00115* (2013.01); *G11B 20/00688* (2013.01); *G11B 20/00876* (2013.01); *G11B 23/0035* (2013.01); *G11B 23/283* (2013.01); *H04L 9/3278* (2013.01); *G06F 21/00* (2013.01); *G06Q 2220/16* (2013.01); *G06Q 2220/165* (2013.01); *G11B 2220/2537* (2013.01); *G11B 2220/657* (2013.01); *H04L 2209/605* (2013.01); *H04L 2463/101* (2013.01)

(58) Field of Classification Search
CPC ............. G11B 19/12; G11B 20/00086; G11B 20/00094; G11B 20/001; G11B 20/0068; G11B 20/008; G11B 20/009; G11B 23/28; G11B 20/00; G06F 3/06; H04L 2209/60; H04L 2463/10; H04L 9/32
USPC ................... 726/1–21, 26–33; 713/168–194; 428/64.1–65.9; 380/200–203, 380/228–230, 232–234, 239–242
See application file for complete search history.

(56) References Cited

U.S. PATENT DOCUMENTS 6,266,299 B1 * 7/2001 Oshima et al. ............. 369/13.38
7,089,420 B1 * 8/2006 Durst et al. .................... 713/176
(Continued)

OTHER PUBLICATIONS

Vijaywargi, Deepak, Dave Lewis, and Darko Kirovski. "Optical DNA." Financial Cryptography and Data Security. Springer Berlin Heidelberg, 2009. 222-229.*
(Continued)

*Primary Examiner* — Madhuri Herzog
(74) *Attorney, Agent, or Firm* — Saliwanchik, Lloyd & Eisenschenk

(57) ABSTRACT

Disclosed herein is an illegal copy prevention system and method. In short, an anti-copy prevention system of the present invention includes, a chipless RFID disk having a print layer distributed with metal fibers; an Optical Disk Drive (ODD) reading, recorded information when mounted with the chipless RFID disk; and a reader installed in the disk drive to sense whether metal fibers distributed at the printed layer exists and a unique ID contained in the metal fiber.

9 Claims, 4 Drawing Sheets

(51) Int. Cl.
*G11B 19/12* (2006.01)
*G11B 23/00* (2006.01)
*G11B 23/28* (2006.01)

(56) References Cited

U.S. PATENT DOCUMENTS

| | | | |
|---|---|---|---|
| 7,577,844 B2 * | 8/2009 | Kirovski | 713/180 |
| 7,760,906 B2 * | 7/2010 | Brundage et al. | 382/100 |
| 7,995,196 B1 * | 8/2011 | Fraser | 356/71 |
| 2005/0111342 A1 * | 5/2005 | Wisnudel et al. | 369/275.3 |
| 2009/0130299 A1 | 5/2009 | Chopra et al. | |
| 2009/0196158 A1 * | 8/2009 | Vast et al. | 369/275.3 |
| 2009/0218401 A1 | 9/2009 | Moran et al. | |
| 2009/0302237 A1 * | 12/2009 | Bortz et al. | 250/473.1 |
| 2009/0309733 A1 | 12/2009 | Moran et al. | |
| 2010/0006647 A1 | 1/2010 | Tada et al. | |

OTHER PUBLICATIONS

International Search Report in International Application No. PCT/KR2010/008644, filed Dec. 3, 2010.

* cited by examiner ( 9a )

( 9b )

( 10a )

( 10b )

( 12a )

( 12b )

( 12c )

SYSTEM AND METHOD FOR PREVENTING ILLEGAL COPY

CROSS-REFERENCE TO RELATED APPLICATIONS

This application is the U.S. national stage application of International Patent Application No. PCT/KR2010/008644, filed Dec. 3, 2010, which claims priority to Korean Application No. 10-2010-0047260, filed May 20, 2010, the disclosures of each of which are incorporated herein by reference in their entirety.

TECHNICAL FIELD

The present invention relates to an anti-piracy system and method for verifying legality of an ID of a disc mounted on a disc drive, as a disc is formed with a printed layer distributed with metal fibers.

BACKGROUND ART

An RFID (Radio Frequency Identification) system is a contactless recognition system for transmitting and processing object information and work environmental information.

An RFID system that has appeared since 1980s is called a radio recognition system, a radio frequency identification system or a radio identification system.

RFID systems are basically comprised of an RFID tag storing data, and an RFID reader having a reading function of data stored in the RFID tag.

The RFID tag is comprised of an RFID tag chip and an antenna manufactured in semiconductor, and may be categorized into a passive type and an active type based on operation characteristic.

A passive type is a formation of operating by supplying energy from a propagation signal of an RFID reader, and an active type is a formation of an RFID tag embedded with an electric cell for unaided operation.

Radio frequency identification technologies used in an RFID system have advantages of a direct contact like a barcode or an unnecessary scanning within a visible light band.

Owing to such advantages, an RFID system has been evaluated as a barcode system-replaceable system and has a prospect of its availability range also expanding steadily.

As an RF (Radio Frequency) band used in an RFID system, there exist 30-500 kHz band as a low frequency band, 850-950 MHz and 2.4-2.5 GHz bands as high frequency bands.

Herein, a low frequency band has a relatively short recognition range, that is, lower than 1.8 m, and a high frequency band has a relatively long RF recognition, that is, more than 27 m.

Hence, depending on whether a recognition range should be long or satisfied to be only short, it is possible to apply and employ an RFID system using an RF signal of a corresponding frequency band.

Such an RFID system is attached on a certain item, and comprised of an RFID tag storing information on that item, and an RFID reader communicating with the RFID tag.

The RFID reader modulates and sends out an RF (Radio Frequency) signal having a specific carrier frequency.

When an item attached with the RFID tag is placed within a read zone of the RFID reader, the RFID tag receives a signal sent by the RFID reader, and transmits pieces of predefined information stored in an intra-memory to the RFID reader in response to a received signal.

DISCLOSURE OF INVENTION

Technical Problem

An object of the present invention is to solve challenges of verifying lawfulness of an ID of a disk mounted on a disc drive, since the disk has a printed layer distributed with metal fibers.

Solution to Problem

The present invention provides an anti-copy prevention system including, a chipless RFID disk having a print layer distributed with metal fibers; an Optical Disk Drive (ODD) reading recorded information when mounted with the chipless RFID disk; and a reader installed in the disk drive to sense whether metal fibers distributed at the printed layer exists and a unique ID contained in the metal fiber.

The present invention provides an anti-copy prevention method including, mounting a chipless RFID disk having a printed layer distributed with metal fibers, on a disk drive installed with a reader; reading the chipless RFID disk by the reader; determining whether metal fibers in the chipless RFID disk exist as a result of reading the chipless RFID disk; and reading the disk using the disc drive, in a case whether metal fibers in the chipless RFID disk exist is lawful.

The present invention provides an anti-copy prevention method including the steps of, mounting a chipless RFID disk having a print layer distributed with metal fibers in a disc drive installed with a reader; reading the chipless RFID disk by means of the reader; determining whether metal fibers in the chipless RFID disk exist as a result of reading the chipless RFID disk; recognizing an ID contained in metal fibers of the chipless RFID disc, when a piece of metal fibers exist in the chipless RFID disk; determining if the contained ID is a lawful ID; and reading the disk using the disk drive, in a case the ID is lawful.

Advantageous Effects of Invention

In an anti-copy prevention system according to the present invention, a disk is formed with a print layer distributed with metal fibers, and a disk drive is installed with a reader, so that the present invention creates an effect of discriminating whether to be a real-made disk or an unlawful disk using a print layer distributed with the metal fibers, thereby preventing an illegal copy.

Further, an anti-copy prevention system according to the present invention is formed of a printed layer distributed with metal fibers, so that the present invention has an effect of detecting an ID using a chipless RFID technology that no chip exists.

BEST MODE FOR CARRYING OUT THE INVENTION

Hereinafter, reference will be made below to the accompanying drawings in describing an embodiment of the invention.

Figure 1:
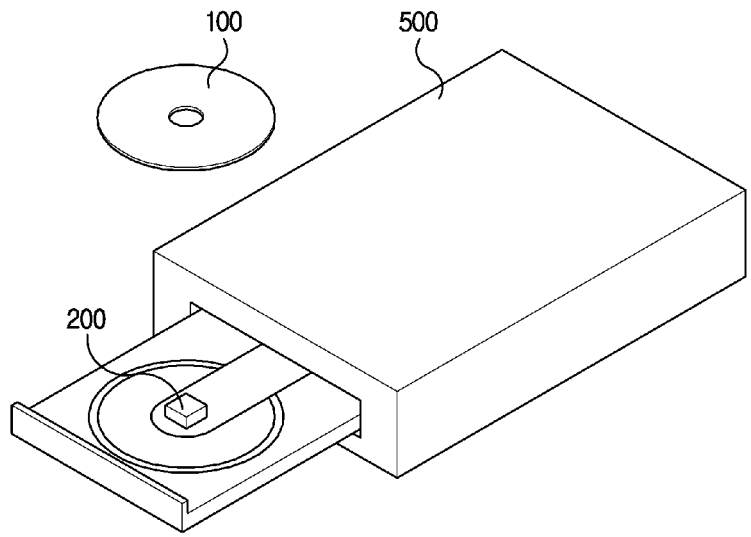
FIG. 1 is a schematic perspective view in describing an anti-copy prevention system according to the present invention.

FIG. 1 is a schematic perspective diagram for describing an anti-copy prevention system according to the present invention.

An anti-copy prevention system according to the present invention includes a chipless RFID disk 100 having a printed layer distributed with metal fibers; an Optical Disk Drive (ODD) 500 mounted with the chipless RFID disk 100 to read recorded information; a reader 200 installed at the disc drive 500, sensing whether or not metal fibers distributed on the print layer exist and a unique ID (IDentification number) contained in the metal fibers.

And, an anti-copy prevention system may further have a host computer device sending out a control signal of reading information recorded in the chipless RFID disk 100 into the disk drive 500, in a case an ID sensed at the reader 200 by an connection of the disk drive 500 is lawful.

The host computer device may be configured of a common personal computer.

In such an anti-copy prevention system according to the present invention, the reader 200 installed at the disc driver 500 illuminates microwave into a print layer distributed with the metal fibers before the chipless RFID disk 100 is mounted in the disk drive 500 which then picks-up recorded information, reflecting waves of a specific waveform may produce from the metal fibers and the reader 200 may sense a unique ID contained on metal fibers distributed on the print layer by detecting the reflecting waves.

Therefore, a disk not formed of a print layer distributed with the metal fibers or a disc in which a print layer distributed with the metal fibers are formed but its ID is not authenticated may be determined as an illegal disc.

In the end, an anti-copy prevention system according to the present invention is formed of a print layer distributed with metal fibers on a disc, a reader is installed at a disc drive, so that the invention can have advantages of discriminating whether to be a real-made disc or an illegal disc based on a print layer distributed with the metal fibers, thereby preventing an anti-copy.

And, since a printed layer distributed with metal fibers is formed, an anti-copy prevention system of the present invention has an advantage of detecting an ID using a chipless RFID technology non-existent of a chip.

Meanwhile, the chipless RFID-purpose disc 100 may be realized with one of a CD (Compact Disc), a DVD (Digital Versatile Disc), a BD (Blu-ray Disc), and a HD-DVD (High Definition Digital Versatile Disc).

Figure 2:
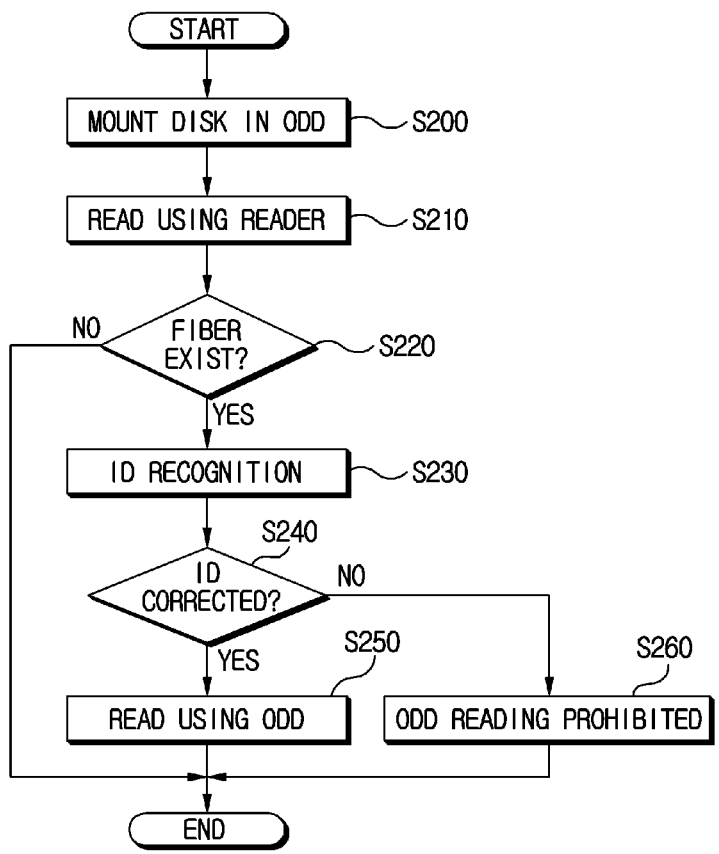
FIG. 2 is a flow chart showing a flow of an anti-copy prevention method according to the present invention.

FIG. 2 is a flow chart showing a flow of an anti-copy prevention method according to the invention.

First, a chipless RFID-purpose disc having a print layer distributed with metal fibers is mounted into a disc drive installed with a reader (S200).

After that, the reader reads the chipless RFID-purpose disc (S210), and determines whether metal fibers exist in the chipless RFID disc from a reading result of the chipless RFID-purpose disk (S220).

Continuedly, when in the chipless RFID-purpose disk metal fibers exist, an ID contained in metal fibers of the chipless RFID-purpose disc is recognized (S230).

And the next, whether or not the contained ID is a lawful ID is determined (S240).

Herein, a determination of a lawful ID in the step 240 may be conducted by connecting the reader to a host computer device and a communication with an external server by the host computer device via a wired line or a wireless line, and such a method may be realized variously.

And, a determination of the lawful ID, namely, determines conformity of an ID, validity of an ID (valid date) and so on.

Continuedly, in a case the ID is lawful, it reads with a disc drive. (S250)

And, in a case the ID is not lawful, it does not read by a disc drive. (S260)

That is, in a case the ID is lawful, it reads as a genuine-made disk not configured for an illegal copy prevention.

Figure 3:
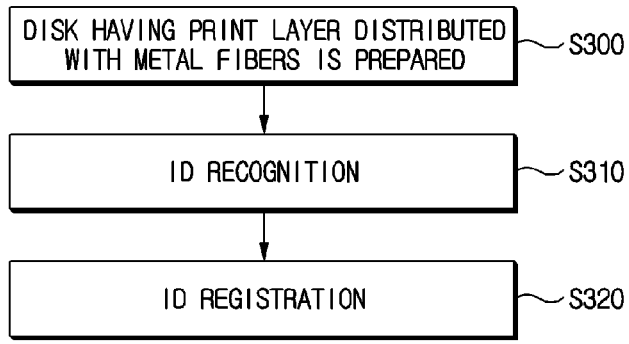
FIG. 3 is a schematic flow diagram describing a manufacturing method of a chipless RFID-purpose disk applied to the invention.

FIG. 3 is a schematic flow diagram of describing a manufacturing method of a chipless RFID-purpose disk applied to the present invention.

A chipless RFID-purpose disk having a print layer distributed with metal fibres is prepared. (S300)

Herein, the chipless RFID-purpose disk may be realized by various embodiments as later-described diversely.

Successively, the metal fibers are read by means of a reader and then an ID is recognized. (S310).

Continuedly, by matching an ID recognized using the reader with manufacture information of the chipless RFID-purpose disk, an ID is registered into a server. (S320)

Thus, the present invention can have advantages of easily reading bits of information such as manufacture information using a chipless RFID technology by manufacturing a chipless RFID-purpose disk, thereby conveniently managing all related information such as post-manufactured distribution channel and manufacturing process history.

Figure 4:
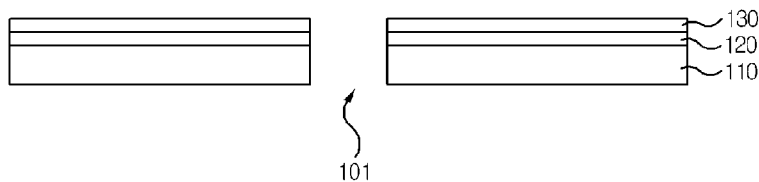
FIG. 4 is a schematic cross-sectional view in describing a chipless RFID-purpose disk according to the present invention.

FIG. 4 is a schematic cross-sectional view of describing a chipless RFID disk according to the present invention.

A chipless RFID-purpose disk includes a substrate 110 formed with a recorded layer (not shown); a reflecting layer 120 formed on a recorded layer of the substrate 110; a protective layer 130 formed on the reflecting layer 120, and at least one of the substrate 110, the reflecting layer 120 and the protective layer 130 is formed with a printed layer distributed with metal fibers.

And, a centre area of the substrate 110 is formed of a through hole 101.

That is, after a manufacture of a chipless RFID-purpose disk is completed, use of the through hole 101 facilitates packing, or the through hole 101 may facilitate a user grip.

Mode for the Invention

Figure 5:
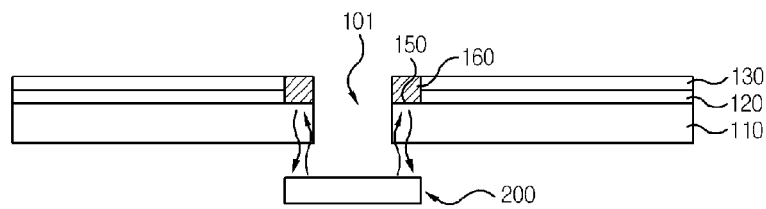
FIG. 5 is a schematic cross-sectional view in describing a chipless RFID-purpose disk according to a first embodiment of the present invention.

FIG. 5 is a schematic cross-section view for describing a chipless RFID-purpose disk according to a first embodiment of the invention.

A chipless RFID-purpose disk according to a first embodiment of the invention is comprised of a structure that a surrounding of a through hole 101 of a substrate 110 has a substrate area 150 not formed of a recorded layer, and a substrate area 150 not formed of the record layer is formed with a print layer 160 distributed with metal fibers.

Thus, it is easy that a reader 200 installed at an optical disc drive illuminates microwave into a printed layer 160 distributed by the metal fibers, and the reader 200 easily detects reflecting waves produced from the metal fibers.

Figure 6:
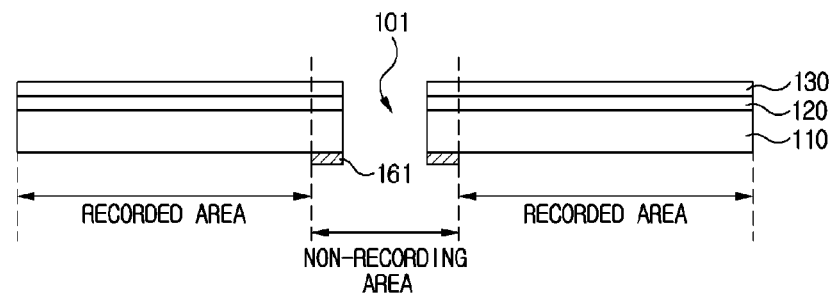
FIG. 6 is a schematic cross-sectional view in describing a chipless RFID-purpose disk according to a second embodiment of the present invention.

FIG. 6 is a schematic cross-section view for describing a chipless RFID-purpose disk according to a second embodiment of the present invention.

A chipless RFID-purpose disk according to a second embodiment of the present invention is divided into a recorded area and a non-record area, and comprised of a structure that a print layer 161 distributed with metal fibers is formed in the non-recording area.

Also, the substrate 110 may be divided as a recorded area and a non-recording area, and the non-recording area may be formed with a print layer 161 distributed with metal fibers.

At this time, the non-recording area may be realized of a surrounding area of a through hole 101 of a substrate 110.

And, a print layer 161 distributed with the metal fibers may be formed at the substrate 110 lower part area of the non-recording area.

Figure 7:
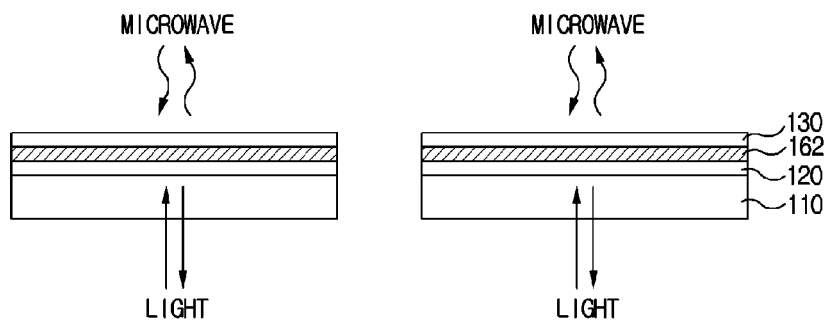
FIG. 7 is a schematic cross-sectional view in describing a chipless RFID-purpose disk according to a third embodiment of the present invention.
Figure 8:
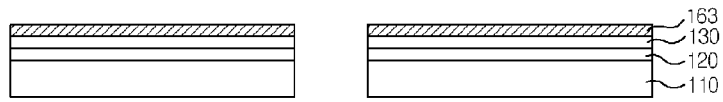
FIG. 8 is a schematic cross-sectional view in describing a chipless RFID-purpose disk according to a fourth embodiment of the present invention.

FIG. 7 is a schematic cross-section view for describing a chipless RFID-purpose disk according to a third embodiment of the invention, and FIG. 8 is a schematic cross-section view for describing a chipless RFID-purpose disk according to a fourth embodiment of the present invention.

A chipless RFID-purpose disk according to a third embodiment of the present invention includes a substrate 110 formed with a recorded area (not shown); a reflecting layer 120 formed on the recorded layer of the substrate 110; a print layer 162 distributed with metal fibers, formed on the reflecting layer 120; and a protective layer 130 formed on the print layer 162.

That is, a print layer 162 distributed with the metal fibers is formed between the reflecting layer 120 and the protective layer 130.

And, the recorded layer is formed on the upper part surface of the substrate 110, and the recorded layer upper part is formed with a reflecting layer 120.

Thus, in the substrate 110 lower part surface light for reading information recorded in the record layer is illuminated at an optic pickup device, and the optic pickup device senses light reflected at the reflecting layer 120.

And, the substrate 110 upper part is placed with a reader, and microwave illuminated from the reader penetrates the protective layer 130 and illuminates a print layer 162 distributed with the metal fibers, thereby sensing a unique ID contained in metal fibers distributed on the print layer.

Also, as shown in FIG. 8, a chipless RFID-purpose disk according to a fourth embodiment of the invention may be realized by forming on a protective layer 130 upper part a print layer 163 distributed with metal fibers.

Figure 9:
FIGS. 9a and 9b are schematic cross-sectional views in describing a chipless RFID-purpose disk according to a fifth embodiment of the present invention.
Figure 9:
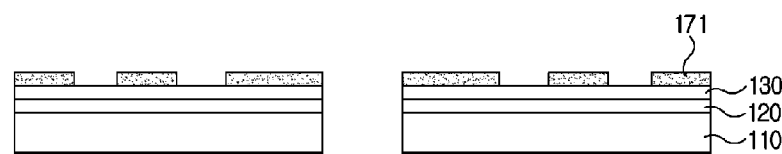

FIGS. 9a and 9b are schematic cross-section views for describing a chipless RFID-purpose disk according to a fifth embodiment of the invention.

A chipless RFID-purpose disk according to a fifth embodiment of the invention has a structure that metal fibers are distributed in a label printed layer 170 printed with product name, classification number, notices on treatment, size of product, and prices.

Such a label printed layer 170 is formed at the upper part surface of a protective layer 130.

At this time, as shown in FIG. 9a, all the protective layer 130 upper part surface may be formed with a label print layer 170, and as shown in FIG. 9b, the protective layer 130 upper part surface may be formed with a label printed layer 171 distributed with metal fibers.

Figure 10:
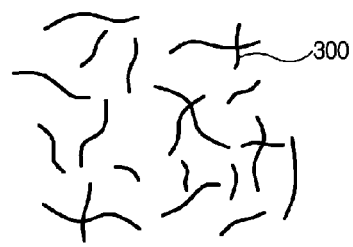
FIGS. 10a and 10b are schematic conceptional views in describing a pattern of metal fibers distributed on a printed layer applied to the present invention.
Figure 10:

FIGS. 10a and 10b are schematic conceptual views for describing a pattern of metal fibers distributed at a print layer applied to the invention.

Metal fibers are distributed in a print solution, and printed on at least one of a substrate, a reflecting layer and a protective layer.

Herein, each time a print layer distributed with the metal fibers is printed, a pattern made with metal fibers distributed with each of printed layer becomes different.

That is, before the print layer is printed, the metal fibers are distributed in a print solution of liquid state, and its position is randomly fixed on a print layer.

Therefore, as shown in FIGS. 10a and 10b, a print layer differentiates for a pattern made with metal fibers 300.

Thus, a chipless RFID-purpose disk of the invention may be beneficially employed for RFID (Radio-Frequency IDentification), since a pattern made of metal fibers distributed on a print layer becomes a sole pattern and can have a unique value.

Figure 11:
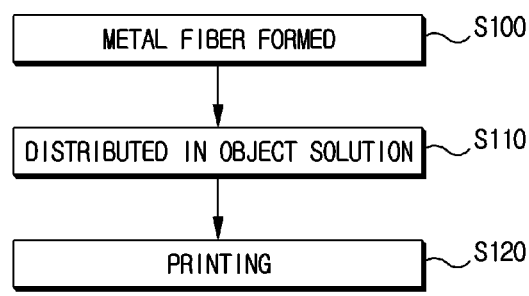
FIG. 11 is a schematic flow diagram in describing a manufacturing method of a chipless RFID-purpose disk of the present invention.

FIG. 11 is a schematic flow diagram for describing a method of manufacturing a chipless RFID-purpose disk of the invention.

First, metal fibers are formed. (S100)

The metal fibers are formed by metal coating of textile fibers, or formed by grinding metal material.

That is, each of the metal fibers is comprised of a textile fiber; and a metal layer coating the textile fiber, or comprised of a metal fiber of single material.

After that, the metal fibers will be distributed into an object solution. (S110)

Herein, that the object solution is a print solution is preferable.

And the next, during a process of forming a reflecting layer in a recording layer of a substrate having a recorded layer and forming a protective layer in the reflecting layer, an object solution distributed with the metal fibers will be printed in at least one of the substrate, the reflecting layer and the protective layer. (S120)

Figure 12:
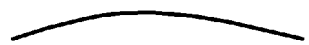
FIGS. 12a to 12c are conceptional views showing a distributed state with metal fibers applied to the invention.
Figure 12:
Figure 12:
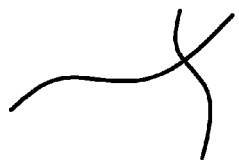

FIGS. 12a through 12c are conceptional views showing a metal fibers distributed state applied to the invention.

Metal fibers have a shape thin in thickness and long in length, or have at least one of a curved or intersected shape.

Therefore, like FIG. 12a, they are distributed as a single state, or, such as FIG. 12b, a metal fiber having two curved ones may be distributed.

And, as shown in FIG. 12c, those may be distributed into a state in which at least two are intersected.

While the present invention have been concretely described about only a specific example, it would be understood by those skilled in the art that any embodiment of various modifications and alterations can be made within the scope of the invention technology, and such modifications and alterations must fall in the accompanying claims.

INDUSTRIAL APPLICABILITY

The present invention realizes an illegal copy prevention system in which a disk is formed with a print layer distributed with metal fibers, and a disk drive is installed with a reader, so that the present invention can discriminates whether to be a real-made disk or an unlawful disk using a print layer distributed with the metal fibers, thereby preventing an illegal copy.

The invention claimed is:

1. An anti-copy prevention system, comprising:
a chipless RFID disk having a print layer distributed with metal fibers;
an Optical Disk Drive (ODD) reading recorded information when mounted with the chipless RFID disk; and
a reader installed in the ODD to sense whether the metal fibers distributed at the printed layer exist and to sense a unique ID contained in the metal fibers,
wherein the chipless RFID disk comprises:
a substrate having a first region and a second region;
a reflecting layer formed on the first region of the substrate; and
a protective layer formed on the reflecting layer,
wherein a central area of the substrate has a through hole formed therethrough,
wherein the second region is a surrounding area of the through hole,
wherein the print layer is formed on the second region of the substrate,
wherein a first side surface of the print layer is in direct physical contact with a first side surface of the reflecting layer and a first side surface of the protective layer,
wherein the first side surface of the print layer comprises a first part contacted with the first side surface of the reflecting layer and a second part contacted with the first side surface of the protective layer,
wherein a second side surface of the print layer is exposed to an outside by the through hole,
wherein a top surface of the print layer is exposed to an outside,
wherein a bottom surface of the print layer is in direct physical contact with a top surface of the substrate,
wherein the first region is a recorded region and the second region is an unrecorded region, and
wherein the first side surface of the print layer, the first side surface of the reflecting layer, and the first side surface of the protective layer are a boundary line between the first region and the second region.

2. The system of claim 1, wherein the chipless RFID disk is one of a CD (Compact Disc), a DVD (Digital Versatile Disc), a BD (Blu-ray Disc), and a HD-DVD (High Definition Digital Versatile Disc).

3. The system of claim 1, wherein the metal fibers have a shape thin in thickness and long in length, or have at least one of a curved or intersected shape.

4. The system of claim 1, wherein each of the metal fibers comprises a textile fiber and a metal layer coating the textile fiber, or comprises a metal fiber of a single material.

5. An anti-copy prevention method, comprising:
mounting a chipless RFID disk having a print layer distributed with metal fibers, on a disk drive installed with a reader;
reading the chipless RFID disk by the reader;
determining, as a result of reading the chipless RFID disk, whether the metal fibers in the chipless RFID disk exist;
recognizing an ID contained in the metal fibers of the chipless RFID disk, when the metal fibers exist in the chipless RFID disk;
determining whether the contained ID is a lawful ID; and
reading the disk using the disk drive when the contained ID is lawful,
wherein the chipless RFID disk comprises:
a substrate having a first region and a second region;
a reflecting layer formed on the first region of the substrate; and
a protective layer formed on the reflecting layer,
wherein a central area of the substrate has a through hole formed therethrough,
wherein the second region is a surrounding area of the through hole,
wherein the print layer is formed on the second region of the substrate,
wherein a first side surface of the print layer is in direct physical contact with a first side surface of the reflecting layer and a first side surface of the protective layer,
wherein the first side surface of the print layer comprises a first part contacted with the first side surface of the reflecting layer and a second part contacted with the first side surface of the protective layer,
wherein a second side surface of the print layer is exposed to an outside by the through hole,
wherein a top surface of the print layer is exposed to an outside,
wherein a bottom surface of the print layer is in direct physical contact with a top surface of the substrate,
wherein the first region is a recorded region and the second region is an unrecorded region, and
wherein the first side surface of the print layer, the first side surface of the reflecting layer, and the first side surface of the protective layer are a boundary line between the first region and the second region.

6. The method of claim 5, wherein the bottom surface of the print layer lies in the same plane as a bottom surface of the reflecting layer, and wherein the top surface of the print layer lies in the same plane as a top surface of the protective layer.

7. The system of claim 1, wherein the bottom surface of the print layer lies in the same plane as a bottom surface of the reflecting layer.

8. The system of claim 1, wherein the top surface of the print layer lies in the same plane as a top surface of the protective layer.

9. The system of claim 1, wherein a second side surface of the print layer is exposed to an outside by the through hole.

* * * * *